United States Patent

[11] 3,614,148

| [72] | Inventor | Ethelbert Favary<br>1246 North Laurel Ave., Los Angeles, Calif. 90046 |
|---|---|---|
| [21] | Appl. No. | 756,352 |
| [22] | Filed | Aug. 28, 1968 |
| [45] | Patented | Oct. 19, 1971 |

[54] SHOCK ABSORBING VEHICLE BUFFER
8 Claims, 10 Drawing Figs.

[52] U.S. Cl. .................................................. 293/72,
267/136, 267/139, 293/62, 293/63, 293/86, 293/89, 293/99
[51] Int. Cl. .................................................. B60r 19/04,
B61f 19/00, F16f 7/00
[50] Field of Search............................................ 293/9, 17, 30, 72, 85, 86, 62, 63, 89, 99; 267/1 FB, 136, 139

[56] References Cited
UNITED STATES PATENTS

| 1,843,902 | 2/1932 | Ridge | 180/92 |
| 2,600,060 | 6/1952 | Lopes et al. | 293/85 |
| 967,900 | 8/1910 | Graff | 293/86 |
| 1,175,780 | 3/1916 | Linkhart | 293/86 X |
| 1,465,590 | 8/1923 | Rodgers | 293/72 X |
| 1,686,535 | 10/1928 | Schauman | 293/72 |
| 1,701,308 | 2/1929 | Rosenberg | 293/72 |
| 1,792,157 | 2/1931 | Franke | 293/72 |
| 2,903,289 | 9/1959 | Klix | 293/85 |
| 3,140,111 | 7/1964 | Dabroski | 293/17 |
| 3,333,880 | 8/1967 | Tavano, Sr. | 293/30 |
| 3,355,208 | 11/1967 | Brock | 293/9 |

Primary Examiner—Arthur L. La Point
Assistant Examiner—Howard Beltran

ABSTRACT: A safety device for motor vehicles for preventing damage to the vehicle and injury to passengers when in collision with other objects. The device consists of a number of strong pliable bands in great tension and attached at their opposite ends to solid supports. The tension in the bands resists the impact forces and absorbs the energy generated by the collision. In addition, for very high impact forces other means, like springs, are used to further absorb the energy of the collision.

PATENTED OCT 19 1971 3,614,148
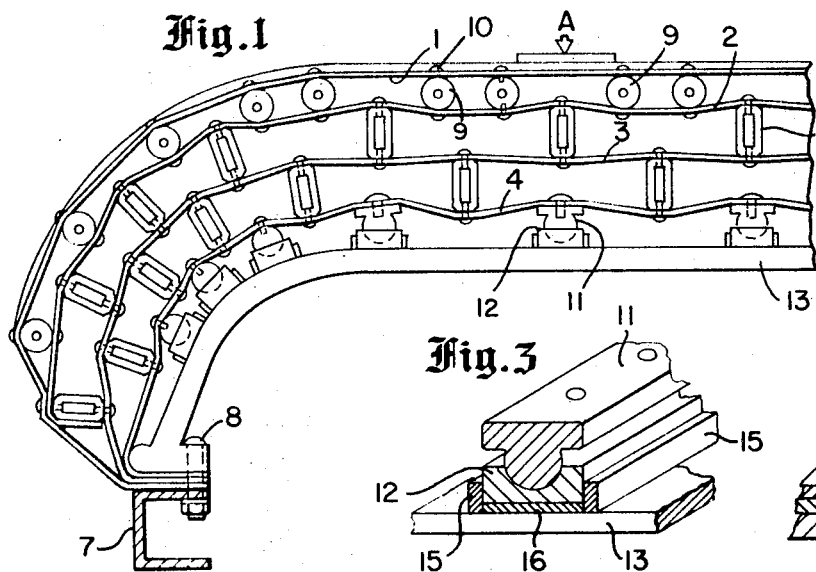
Fig.1
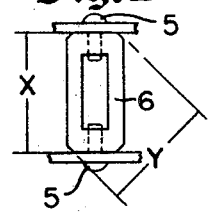
Fig.2
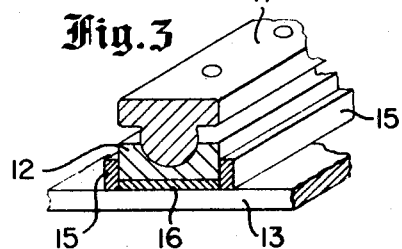
Fig.3
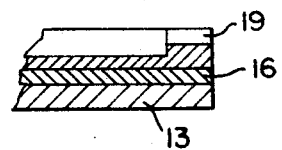
Fig.4
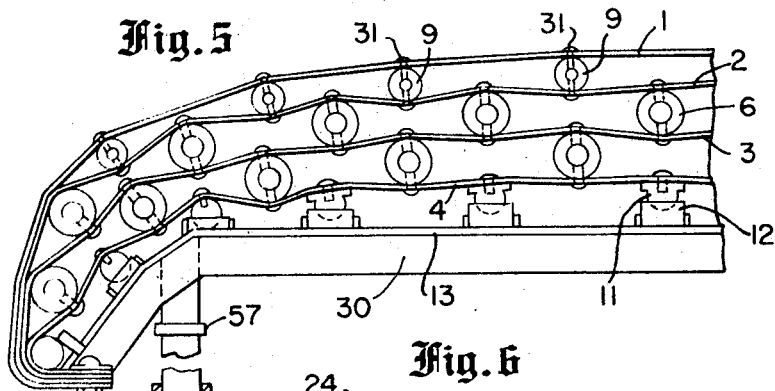
Fig.5
Fig.8
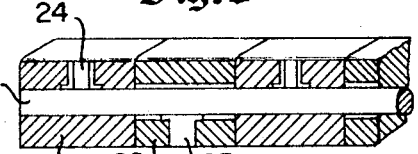
Fig.6
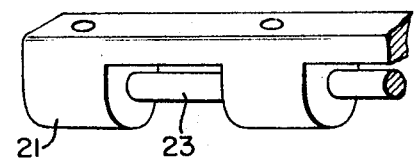
Fig.7
Fig.10
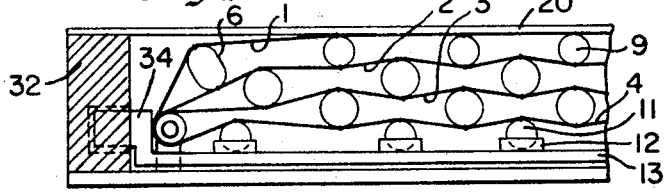
Fig.9
INVENTOR.
Ethelbert Favary

SHOCK ABSORBING VEHICLE BUFFER

BACKGROUND OF THE INVENTION

This invention relates to a new type of buffer construction to prevent or reduce damage to motor vehicles and injury to passengers when in collision, without the usual type of bumpers or fenders and with a reduction in the kinetic energy of the moving parts which are displaced. It will increase the amount of energy absorption which is generated by the collision and it will greatly reduce the weight of the parts usually displaced by bumpers or steel plates and other types as used hitherto.

BRIEF DESCRIPTION OF THE DRAWINGS

The features of the present invention which are believed to be novel are set forth with particularlity in the appended claims. The present invention, both as to its organization and manner of operation, together with further objects and advantages thereof, may best be understood by reference to the following description taken in connection with the accompanying drawings in which:

FIG. 1 is a top view of the buffer device showing details of the plurality of bands and attachment thereof to the frame of the vehicle can be made;

FIG. 2 is an enlarged view of one of the larger spacers employed to separate adjacent bands;

FIG. 3 shows details of one of the interconnecting rocker supports coupling the base to the innermost adjacent band;

FIG. 4 is an enlarged fragmentary sectional view showing the rocker support coupling to the base;

FIG. 5 is a modified form of the buffer device resting on a shock absorbing base and springs so that the bands move as a unit towards and away from the frame and illustrates details on the springs which come into action when the first device has reached the limit of its give;

FIG. 6 shows a modified form of an interconnecting rocker support made of two halves with a pin in the center around which the halves can sway or rock;

FIG. 7 is a perspective view of one-half of the modified form of rocker support as shown in FIG. 6;

FIG. 8 is an end elevational view of the modified rocker support.

FIG. 9 is a top diagrammatic view of another embodiment of the inventive buffer device fitted into the door of the vehicle, partly in section; and FIG. 10 is a front view of a portion of the door (partly in section) containing the device.

DESCRIPTION OF THE PREFERRED EMBODIMENT

In carrying my invention into practice, I provide a number of strong, pliable bands of belting marked 1, 2, 3 and 4 in FIGS. 1 and 6 of the drawings. These bands may be made endless or composed or one or more layers or plies of nylon, sea-island cotton belting, or any other suitable material; for example, belting made of very fine, steel wires. For vehicles carrying heavy loads I may use steel, link chains for the bands. When the bands are woven it is preferable to have the warp (the longitudinal threads) remain straight while the woof is suitably woven around them to eliminate as much stretch as possible, if any, in service. Between adjacent bands I insert solid, or substantially solid, spacers 6 made of any suitable material; for example, aluminum, steel tubing flattened where it touches the bands, hard wood, or what is known in the trade as red or white fiber. These spacers are attached to the bands by rivets or other suitable means. FIG. 2 shows holes in the supports on top and at the bottom through which rivets 5 are inserted or screws for attaching the spacers to the bands. The entire device may be made waterproof, and on top of the outermost band I may provide some rubber of any suitable material of any desired thickness. The ends of the bands are attached to rigid and solid portions 7 of the frame or body by bolts 8.

The spacers are attached to the bands in such a manner that they can sway slightly or rock from side to side when an extra load or impact is applied to them via the bands. For example if an additional load or impact (in addition to the tension in the band) is applied to the top at A, FIG. 1, the nearest round spacer 9 attached to the bands 1 and 2 by rivets 10 will be depressed. This in turn will deflect spacers 6 and 9 to a certain degree, and this will increase the tension in the bands a certain amount, depending on the magnitude of the impact. FIG. 3 gives details of one type of an elongated spacer. It discloses that the distance Y is greater than X and hence, as they slightly rock under impact, the increased tension in the band, due to the increased distance of Y, will first pull some supports closer together as they descent slightly. When the increased tension is removed, the normal tension in the bands will pull the supports back to their normal positions. The rocker supports below the innermost band 4 may be made as shown enlarged in FIGS. 3 and 4. Here the main parts of the supports are made in two pieces indicted by numerals 11 and 12; rocker 11 is fastened or riveted to band 4 while socket 12 is resting on a base 13 and in this manner tending to absorb the energy of the impact. FIG. 1 also shows the end of the device attached to channel section 7 of the frame of the vehicle. Rocker part 11 can rock in socket part 12, which is held in place by flanges or pegs 15. Portion 16 is a wedge which can be inserted to tension the band to the desired degree; this will assist to position the device into place and to make the device harder if required. The empty portions, voids or spaces between the bands of the device which are visible may be filled with soft sponge rubber or other suitable material for the sake of appearance, if desired, or the device may be covered by cloth or other pliable material painted the same color as the body paint.

There are many cars in use today which have what amounts to solid steel parts in front and at the rear; others have very little cushion or means for energy absorption in the front and in the rear. My device could readily be attached to these cars by fastening it to these steel structures in the front and in the rear mechanically by means of clamps of any kind or by welding (which is well known in the art) wherever this is possible. In this manner, the safety of motor vehicles now in use and of their passengers would be increased. In some ceases the solid steel plates or parts which are now on such cars may be taken off and/or my device attached instead. Practically all parts of a motor vehicle may be protected by my device. For example, the vehicle door could have the device, as disclosed in FIG. 10. It is here shown inside of a portion of the body door 20; different parts of the body may be similarly protected.

Some of the interconnection supports including rocker members could be made as shown in FIG. 6 and FIG. 7. Here they are made in two halves 21 and 22 and a pin 23 about which they can sway or rock. The pin may be free to turn in one half and be tight in the other half so that it will not come out in operation. The support halves are dovetailed, one half being attached to the band above it, the other tot the band below it. They are flattened somewhat where they are attached to the bands by fasteners 24 and 25.

The bottom rocker and socket supports 11 and 12 may be like those shown in FIG. 3, It should be understood that all are bands are always under considerable tension after they are in place. In the construction of the device I may take some supports higher than others; this is especially useful when the bands are deflected from a straight line, as seen in FIG. 2 and FIG. 5. Some of the bands and their supports may be made stronger and wider than others. The bands can be made as strong as desired by making each band of a multiplicity of plies instead of a single ply. A simple tool to lock the complete device on the base or rim 13 and to make the device harder or softer may be made from two pieces of flat steel about 1½ inches wide, ¼-inch thick, and 18 inches long. They are bent at right angles, one end of each about 6 inches long, inserted on the rim or base 13 and by raising or lowering the long ends by hand it will raise the supports from the rim when part 12 can be inserted. This will lock the device to the rim. It should be noted that the end of socket 12 has a portion 19, in FIG. 4, which will prevent it from coming out. One end of socket 9 is made somewhat lower (as shown dotted) to facilitate insertion thereof, which is done alternately, first from one side, then from the other side, to have a firmer hold against lateral stresses in case of collision. (Portion 19 in FIG. 4 is higher than the dotted line below it in order to make it easier for insertion.) If desired, a steel flange may be provided at one or both sides of the device, attached to the base 13 connected to a brace 30 (FIG. 5) and reaching up to a certain height, but I do not think this will be necessary in practice because the high tension in the bands will hold the device on the base. If a steel flange is used, its height might be made to indicate that the device is fully depressed, and the larger rivet heads 31 in FIG. 5 could be eliminated.

In FIG. 9 and FIG. 10, the side members of the door (or the sides of the door) are represented by numeral 32 and the chassis or body holds parts 33 and 34 in place when the door is closed. The bands and interconnecting supports may be similar to those in FIG. 1 and FIG. 5. The base 13 has on its right and left bars 33 and 34, respectively, enter the sides of the door. The left bar 34 projects into an aperture at the side of the door when it is closed, as is frequently done in present day automobile construction while at the right, the right bar 33 is locked into side 32 by a hand lever 35 which is part of crank 36 and actuates bar 33.

In FIG. 10, numeral 20 is the cover on the outside of the door, which can be made of flexible material and painted the same color as the door or the car body. Most of the collisions that occur with cars are not of great magnitude ordinarily; the body structure and some small parts are damaged, but the repairs are quite costly; hence besides less injury to passengers this device will also reduce the cost of repairs when accidentally coming into contact with foreign objects. IN the drawings, four bands are shown, but I may use a greater number to obtain a greater amount of give or energy absorption, while in some cases where found practical I may employ only two or three bands with the intervening spacers.

If I use a larger number of bands, the device itself will be higher and it will project beyond the front and rear of the car when fully pressed. For this reason, I may use other means to work in conjunction with the device, as shown in FIG. 5 on the left side. Of course, I use the same construction on both sides of the vehicle. As seen in FIG. 5, attached to the base 13 I employ a piston 50 which enters cylinder 52, at the bottom of which and solidly attached to it, is the spring housing 53, which contains a strong spring 54. The bottom of piston 50 and of which it is a part, is member 55, which is smaller in diameter and projects through the spring 54 and the spring housing 53. When the band portion of the device of FIG. 5 reaches its maximum compression, or the limit of its give, the top of its device will still project outward from the motor vehicle an amount approximately equal to the height of the device itself fully depressed; part 55 which is part of piston 50, will descend and when it reaches spring compression washer 56 will compress spring 54; this spring can be made very strong, and it will absorb further energy created in a collision by the impact. The piston 50 will force washer 56 down, while rings 57 and 58 will prevent the piston 50 from moving upward more than to its normal position. Instead of using the construction as shown in FIG. 5, disclosed with a piston and cylinder, and spring housing, this entire construction may be placed in a channel section of the chassis or the chassis frame or in any other suitable place.

In operation, the device would be quite sensitive when it first comes into contact with a foreign object, since the weight displaced at first is very small, the inertia forces are small, and only gradually, even if very rapidly, as the give increases, will the inertia forces rise. Hence, I believe this device will considerably decrease the impact forces and cause considerably less damage. Provision can be made for the entire construction to slide under the body of the car, until it is fully depressed. In the front, likewise, space can be provided to have it slide inward, unless it is desired to have it project a greater distance in the front. To increase the give and the strength, the entire device may be made of wider bands, and a greater number of these may be embodied in the construction.

To prevent the device from being damaged when it is fully depressed, I may provide stops by employing larger or thicker rivet heads 31 some of which are shown in FIG. 5. When the device is fully depressed, these rivet heads will come together and thereby prevent overstressing the bands, if these should be found necessary in practice.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a motor vehicle having a rigid frame carried on wheels, the combination comprising:
   a buffer mounted on the frame, having a plurality of pliable bands arranged in substantially elongated endless loop relationship having multiple turns in parallel longitudinally extending relationship and being in a common plane transversely disposed across a selected portion of the frame;
   a member fixedly connected to the opposite ends of said loop for movably mounting said bands to said frame so as to permit said bands to move as a unit toward or away from said frame;
   means carried on said mounting member for pivotally supporting the innermost band of said plurality thereon; and
   a plurality of spacers interposed between selected adjacent ones of said bands in alternate relationship and movably secured to said bands for tensioning said bands within the elastic limits in response to impact forces impinging against the outermost band of said plurality of spacers to shift the bands transversely along their length to effect a localized longitudinal movement of the bands as a unit toward or away from said frame to absorb shock.

2. The invention as defined in claim 1 wherein said pivotal supporting means comprises cooperating ball and socket constructions; said ball construction fixedly carried on the face of said innermost band facing said member; and said socket construction fixedly carried on said member in movable connection with said ball construction.

3. In a motor vehicle with a chassis, a shock-absorbing device for minimizing impact forces arising from collisions with foreign objects, the combination comprising:
   a buffer having a plurality of strong pliable and substantially nonelastic bands in tension, all being situated in a common transverse horizontal plane;
   a plurality of strong substantially solid spacers fastened between adjacent ones of said bands to adjustably separate said bands;
   one band of said plurality being attached at its intermediate portion to rocker and socket members carried on a strong base mounted on the vehicle chassis;
   additional bands placed on top of said one band with said intervening spacers alternatively placed between the rocker and the socket members and the adjacent bands; and
   the ends of said bands attached to said base on said vehicle chassis with all the bands in great tension within the elastic limit thereby affecting a shifting of the bands transversely along their lengths during a collision as the bands adjust longitudinally to absorb shock.

4. The invention as defined in claim 3 wherein the shock-absorbing device includes securing means which connect the spacers to said bands and allow said spacers to sway or rock with respect to said bands.

5. The invention as defined in claim 3 wherein the shock-absorbing device includes adjusting means to tension said bands.

6. The invention as defined in claim 3 wherein the shock-absorbing device includes a base mounting to one band rocker and socket supports which base resiliently mounts said buffer on the chassis to be deflected when the impact forces exceed a certain magnitude.

7. The invention as defined in claim 3 wherein the shock-absorbing device includes resilient securing means connecting the buffer to the chassis to further minimize the impact forces arising from collisions, said resilient securing means embodying a medium of compression and expansion actuated by the motion of said base of said buffer.

8. The invention as defined in claim 3 wherein the shock-absorbing device includes resilient securing means connecting said buffer to said chassis to further minimize the impact forces arising from collisions, said resilient securing means embodying a medium of compression and expansion actuated by the motion of said base of said buffer, said medium of compression and expansion is housed in a cylinder and acts against a piston and mechanical fastening means connecting the medium of compression and expansion with said base of said buffer.